US010926785B2

(12) United States Patent
Ambar et al.

(10) Patent No.: US 10,926,785 B2
(45) Date of Patent: Feb. 23, 2021

(54) CHILD CROSS OVER STROLLER

(71) Applicant: David Ambar, Toronto (CA)

(72) Inventors: David Ambar, Toronto (CA); Mitch Thompson, Barrie (CA); Steve Copeland, Barrie (CA)

(73) Assignee: David Ambar, Toronto (CA)

( * ) Notice: Subject to any disclaimer, the term of this patent is extended or adjusted under 35 U.S.C. 154(b) by 0 days.

(21) Appl. No.: 16/485,263

(22) PCT Filed: Feb. 14, 2018

(86) PCT No.: PCT/IB2018/050912
§ 371 (c)(1),
(2) Date: Aug. 12, 2019

(87) PCT Pub. No.: WO2018/150341
PCT Pub. Date: Aug. 23, 2018

(65) Prior Publication Data
US 2020/0001908 A1 Jan. 2, 2020

Related U.S. Application Data

(60) Provisional application No. 62/598,818, filed on Dec. 14, 2017, provisional application No. 62/458,833, filed on Feb. 14, 2017.

(51) Int. Cl.
*B62B 7/08* (2006.01)
*B62B 7/04* (2006.01)
*B62B 7/14* (2006.01)

(52) U.S. Cl.
CPC ............... *B62B 7/046* (2013.01); *B62B 7/08* (2013.01); *B62B 7/142* (2013.01)

(58) Field of Classification Search
CPC .. B62B 7/046; B62B 7/00; B62B 7/02; B62B 7/044
See application file for complete search history.

(56) References Cited

U.S. PATENT DOCUMENTS 6,443,467 B1 * 9/2002 Black .................... B62B 7/046
                                                280/47.38
7,364,171 B2 * 4/2008 Hu ........................ B60B 1/006
                                                280/47.38
(Continued)

FOREIGN PATENT DOCUMENTS

CA      2296903 A1    5/1997
CA      2304410 A1    4/2001
(Continued)

OTHER PUBLICATIONS http://www.momendeavors.com/2013/01/5k-training-with-the-ioovv-cocoon-x2-iogger.html. Jan. 16, 2013 (Jan. 16, 2013). 2 pages.
(Continued)

*Primary Examiner* — John D Walters
*Assistant Examiner* — James J Triggs
(74) *Attorney, Agent, or Firm* — Bereskin & Parr LLP/S.E.N.C.R.L., s.r.l.

(57) ABSTRACT

A cross-over stroller kit is provided. The kit has a main frame assembly to receive at least one child seat assembly. The main frame assembly has a rear wheelbase and an upper attachment feature adapted to receive a lower attachment feature provided on first and second front-end frame assemblies. The first front-end frame assembly has two front wheels and the lower attachment feature adapted to mate with the upper attachment feature to define a city-mode stroller having four wheels. The second front-end frame assembly has a single front wheel and a second lower attachment feature adapted to mate with the upper attachment feature to define a sport-mode stroller having three wheels.

17 Claims, 8 Drawing Sheets

(56) References Cited

U.S. PATENT DOCUMENTS

| | | | | |
|---|---|---|---|---|
| 9,889,872 B2* | 2/2018 | Somerset | ............... | B62B 7/145 |
| 10,442,452 B2* | 10/2019 | Fleming | .................. | B62B 7/126 |
| 2007/0075525 A1* | 4/2007 | Nolan | ....................... | B62B 7/10 |
| | | | | 280/642 |

FOREIGN PATENT DOCUMENTS

| | | | |
|---|---|---|---|
| DE | 20116217 U1 | 2/2002 | |
| DE | 202005009637 U1 | 12/2005 | |
| DE | 202006014197 U1 | 11/2006 | |
| DE | 202007011937 U1 | 11/2007 | |
| FR | 3048401 A1 | 9/2017 | |
| GB | 2449892 A | 12/2008 | |
| WO | 2009046947 A1 | 4/2009 | |
| WO | 2010068975 A1 | 6/2010 | |

OTHER PUBLICATIONS

Matthew Chisholm. "International Search Report and Written Opinion," dated Jun. 11, 2018. International Application No. PCT/IB2018/050912. 8 pages.

Document received in counterpart EP Application No. 18754435.8, dated Nov. 27, 2020 (Extended European Search Report), 8 pages.

* cited by examiner

CHILD CROSS OVER STROLLER

CROSS-REFERENCE TO RELATED APPLICATIONS

This application claims the benefit of U.S. provisional application Ser. No. 62/458,833 filed Feb. 14, 2017 and 62/598,818 filed Dec. 14, 2017, the disclosures of which are hereby incorporated in their entirety by reference herein.

TECHNICAL FIELD

The present application relates to a child stroller with two different front-ends that are independent of each other and are interchangeable on the same main frame.

BACKGROUND

Strollers are a wheeled device used to carry children and are an essential piece of gear for transporting children from the time they are newborns until the children are able to walk a reasonable distance on their own. A stroller needs to keep the child safe and comfortable, and also be usable in the environment where the parent wishes to transport the child.

SUMMARY

In at least one embodiment, a cross-over stroller kit is provided having a main frame assembly adapted to receive at least one child seat assembly. The main frame assembly has a pair of upper-frame supports. A stroller handle is provided at a rearward distal end of the upper-frame supports. An upper attachment feature is provided at a forward distal end of each of the pair of upper-frame supports. The main frame assembly has a rear wheelbase extending from the upper-frame supports. The stroller kit has a first front-end frame assembly having two front wheels connected to a pair of lower-frame supports. The lower-frame supports have a lower attachment feature adapted to mate with the upper attachment feature to secure the first front-end frame assembly to the main frame assembly. The first front-end frame assembly is adapted to be secured to the main frame assembly to define a first stroller having four wheels. A second front-end frame assembly has a single front wheel connected to second pair of lower-frame supports. The second lower-frame supports have a second lower attachment feature adapted to mate with the upper attachment feature to secure the first front-end assembly to the main frame assembly, wherein the second front-end frame assembly is adapted to be secured to the main frame assembly to define a second stroller having three wheels.

According to another embodiment, the upper attachment feature has a receptacle and the first and second lower attachment features have an extrusion sized to be received by the receptacle.

According to another embodiment, each of the pair of upper-frame supports have a folding joint disposed between the rearward distal end and the lower distal end. When the folding joint is actuated, the upper and lower distal ends rotate toward the rear wheelbase. The folding joint is adapted to folded when at least one of the first and second front-end frame assemblies is secured to the main frame assembly.

According to another embodiment, the main frame assembly has a crossbar extending between the upper attachment features thereby connecting the pair of upper-frame supports to provide structural integrity to the main frame assembly when the first and second front-end frame assemblies are removed.

According to another embodiment, the first stroller has a first wheelbase length that is shorter than a second wheelbase length of the second stroller.

According to another embodiment, the diameter of each of the pair of front wheels of the first front-end frame assembly is less than the diameter of the single wheel of the second front-end assembly.

According to another embodiment, the single front wheel of the second front-end frame assembly is adapted to swivel. The second front-end assembly has a lock feature to fix the single wheel and prevent the single wheel from swiveling.

According to another embodiment, the stroller kit has a first child seat assembly and the main frame assembly has a pair of mounting clips to removably mount the first child seat assembly on the main frame assembly. Each mounting clip is disposed along each of the pair of upper-frame supports.

According to another embodiment, the stroller kit has a second child seat assembly that is different from the first child seat assembly. The second child seat assembly mounts to the main frame assembly with the pair of mounting clips.

According to another embodiment, the first child seat assembly has a rigid frame, and the second child seat has flexible fabric that is adapted to fold when the upper-frame supports rotate to a folded position.

In at least one embodiment, cross-over stroller kit is provided. The kit has a main frame assembly to receive at least one child seat assembly. The main frame assembly has a rear wheelbase and an upper attachment feature adapted to receive a lower attachment feature provided on first and second front-end frame assemblies. The first front-end frame assembly has two front wheels and the lower attachment feature adapted to mate with the upper attachment feature to define a city-mode stroller having four wheels. The second front-end frame assembly has a single front wheel and a second lower attachment feature adapted to mate with the upper attachment feature to define a sport-mode stroller having three wheels.

According to another embodiment, at least one of the upper and lower attachment features includes a cam-lever that is rotatable between and locked and unlocked positions. The first and second front-end frame assemblies are detached from the main frame assembly by rotating of the cam-lever to the unlocked position.

According to another embodiment, at least one of the upper and lower attachment features includes a spring-loaded actuator. The first and second front-end frame assemblies are detached from the main frame assembly by actuation of the spring-loaded actuator.

According to another embodiment, at least one of the upper and lower attachment features includes at least one mechanical fastener, wherein the attachment features are separated by removing the mechanical fastener.

In at least one embodiment, a cross-over stroller kit is provided with a main frame assembly adapted to receive at least one child seat assembly. The main frame assembly has a pair of upper-frame supports and a rear wheelbase with a pair of wheels. A first front-end frame assembly has a first pair of lower-frame supports connected to two front wheels. A second front-end frame assembly has a second pair of lower-frame supports connected to a single front wheel. An attachment system secures the main frame assembly to the first and second front-end frame assemblies to define a first stroller configuration having four wheels and a second stroller configuration having three wheels, respectively. The attachment system secures and aligns the pair of upper-frame supports to each of the first pair of lower-frame supports and the second pair of frame bars.

According to another embodiment, the circumference of each of the upper-frame supports is generally equal to the circumference of each of the first and second lower-frame supports so that the upper-frame support and first and second lower-frame supports are generally contiguous when aligned to define the first and second stroller configurations, respectively.

BRIEF DESCRIPTION OF THE DRAWINGS

FIG. 9B illustrates an exploded view of a portion of the attachment interface in

FIG. 9A.

DETAILED DESCRIPTION

Figure 1:
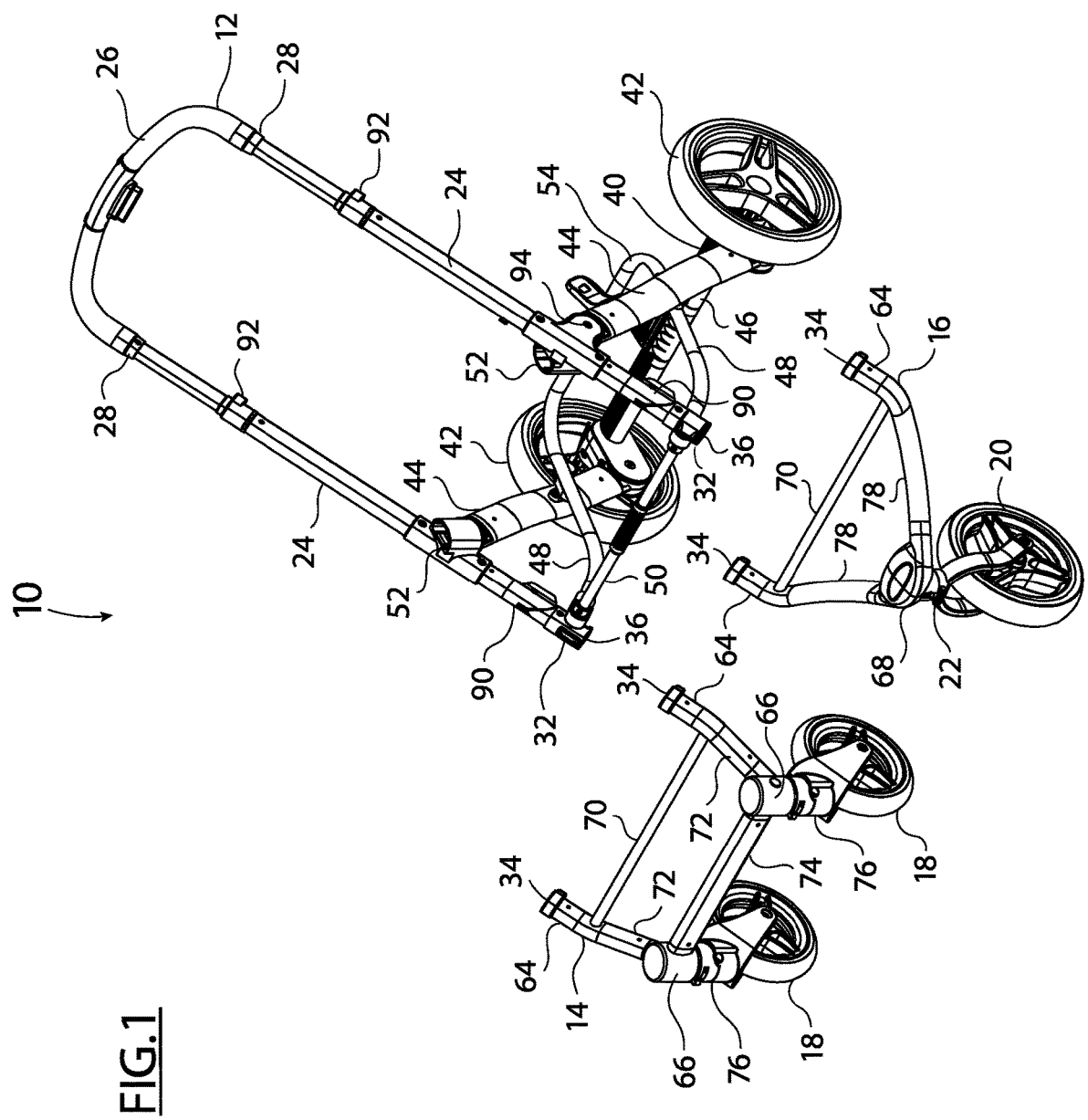
FIG. 1 illustrates a perspective view of a cross-over stroller kit having an upper main frame, a city-mode front-end assembly and a sport-mode front-end assembly.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

For parents with newborns who desire multiple strolling applications there is an ongoing issue between purchasing a four-wheel stroller with the removable and reversible pod-seat and travel system, versus a three-wheel jogger-type stroller, or all-terrain stroller, with a full fabric seat and canopy that is attached to the frame. The current four-wheel style strollers available on the market have a smaller frame and are very limited in their use and strolling application due to the nature of the pod-seat and the smaller frame. When the newborn reaches an age of approximately eighteen months, the child is generally too large to comfortably fit in the pod-seat used in the four-wheel stroller and in many instances the parent is forced to purchase another stroller. Further, while these four-wheel strollers can accommodate an infant pod-seat, these four-wheel strollers do not have a large enough wheels or wheelbase and cannot be used to run or go jogging with and are not suitable be used on all-terrain applications, like gravel roads, beach strolling, strolling in snow, etc.

Three-wheel jogger-style strollers have a large bike-style wheel in front so the parent can go running with the stroller and comfortably use the stroller on varied terrain, including snow. But, the three-wheeled jogger-type strollers cannot use a reversible pod-seat because it is best to have a fixed seat to the frame when running. The fixed seat on three-wheel jogger style strollers do not allow use of a pod seat or travel system that allows the seat to be positioned with the baby facing the parent when strolling. The three-wheel jogger-type stroller is not generally used for newborns or infants and is considered bulky and difficult to store.

Parents must choose between the advantages and disadvantage of a four-wheel style traditional stroller, which may be better for newborns, versus the advantages and disadvantage of a three-wheel all-terrain jogging stroller, which may be better for toddlers, when choosing a stroller to purchase. These issues make it so the parent has narrow strolling applications with each purchase and can be forced to spend more funds upgrading as the child grows larger and still want to be able to achieve the various strolling applications parents desire.

To solve the above-mentioned issues, a cross-over child stroller having interchangeable separate front-ends is provided. The interchangeable and separate front-ends allow the front-end to be detached and swapped out and matched with the one main frame. The cross-over child stroller "creates two strollers in one" with the goal of keeping the structural integrity to pass in stroller safety standards, such as ASTM F833-15, for both stroller configurations using the upper main frame.

In addition, with the cross-over stroller of the present application, a jogger stroller is now much more compact to store and closely mimics a more compact smaller frame while still offering all the jogger stroller features and capabilities needed and is newborn friendly. In addition, parents always consider the future birth of an additional child and this cross-over function allows for the single stroller to become a twin in-line stroller as well for accommodating two children.

FIG. 1 illustrates a perspective view of the cross-over stroller kit 10 according to one embodiment of the present application. The stroller kit 10 has upper main frame 12 and two detachable and interchangeable lower front-end frame assemblies 14, 16. The first front-end frame assembly 14 is a "city-mode" attachment that has two free-wheels that allows the stroller to be compact and maneuverable for use in a city, for example. The second front-end frame assembly 16 is a "sport-mode" attachment that has a larger single wheel 20 with a swivel and lock-in feature 22 for all-terrain and jogging applications. As shown in FIG. 1, the main frame 12 is illustrated without any child seat, however the stroller kit 10 may also include various child seats. The cross-over child stroller of this application allows the one main frame 12 to create two stroller modes and offering many different strolling applications while having a visual look which makes both the city and sport modes and their various applications look like the original feature of the child stroller and maintain the structural integrity of a single-piece frame.

The main frame 12 has a pair of upper-frame supports 24 that extend angularly relative to a strolling surface when the stroller is in use. A handle 26 is provided at rearward distal ends 28 of the upper-frame supports 24. As shown, the handle 26 is a bar that extends between the pair of upper-frame supports 24, however other handle configurations may be used, such as individual grips at the distal end 28 of each upper-frame support 24. The upper-frame supports 24 may be extendable to adjust the height of the handle 26 to accommodate the various height differences for the parent or person pushing the stroller. As shown in FIG. 1, the handle 26 is at the fully extended position. The upper-frame supports 24 may telescope to various height positions to accommodate different height users.

Although the frame of the stroller is split into the upper main frame 12 and lower front-end frame assemblies 14, 16, an attachment system 30 is provided that secures the upper and lower frame assemblies 12, 14, 16 and ensures structural integrity and is aesthetically pleasing. An upper attachment feature 36 is provided at a forward distal end 32 of each of the pair of upper-frame supports 24. The upper attachment feature 36 allows each of the lower front-end frame assemblies 14, 16 to be easily attached and detached. Each of the lower front-end frame assemblies 14, 16 has a lower attachment feature 34 that mates with the upper attachment feature 36 to secure the main frame 12 to each of the lower front-end frame assemblies 14, 16.

The main frame assembly 12 also has a rear wheelbase 40 extending from the upper-frame supports 24. The rear wheelbase 40 has two rear wheels 42 as well as a parking brake and a suspension system. The rear wheelbase 40 includes rear support struts 44 that are pivotally connected between the rear axle 46 and the upper-frame supports 24. The rear support struts 44 can pivot relative to the upper-frame supports 24 when the stroller is moved to a folded position, as shown in FIGS. 6 and 7. In the use position shown in FIG. 1, the rear support struts 44 extend at a non-parallel angle from the upper-frame supports 24. The height of the rear axle 46 mating with the rear struts 44 must be kept in a proper plane to prevent negatively the offset plane when two separate front-end frame assemblies 14, 16 are added to the main frame assembly 12 to ensure a consistent geometry for high performance of the strollers even when the front portion of the plane is mounted to the different front-end frame assemblies 14, 16.

The stroller kit 10 allows the frame to be split into the upper main frame 12 and lower front-end frame assemblies 14, 16 while still ensuring structural integrity and the aesthetic look of a one-piece stroller frame. The main frame 12 includes a main crossbar 50 that maintains structural integrity and rigidity of the main frame 12. The main crossbar 50 connects that upper-frame supports 24 along the front distal ends 32. The main crossbar 50 may also be connected to the attachment system 30.

Structural integrity of the split frame stroller kit is also achieved with elevated side support bars 48. The side support bars 48 are connected to the upper-frame supports 24 along the front distal ends 32 and are also connected to the inside of the rear support struts 44. As illustrated in FIG. 1, the side support bars 48 may also be pivotably connected to the upper-frame supports 24 main crossbar 50 at the attachment system 30. The side support bars 48 may be formed as one-piece with a rear basket bar 54 connected between the side support bars 48.

The main frame assembly 12 also includes mounting clips 52 to receive various child seats, as shown in FIGS. 11 and 12. The mounting clips 52 provides the stroller with seat options that can be mixed and matched from newborn to toddler. The mounting clip on the main frame also allows for additional configurations and various accessory attachments from birth to toddler as well as allowing for twin child seats for two-child strolling capability.

Figure 2:
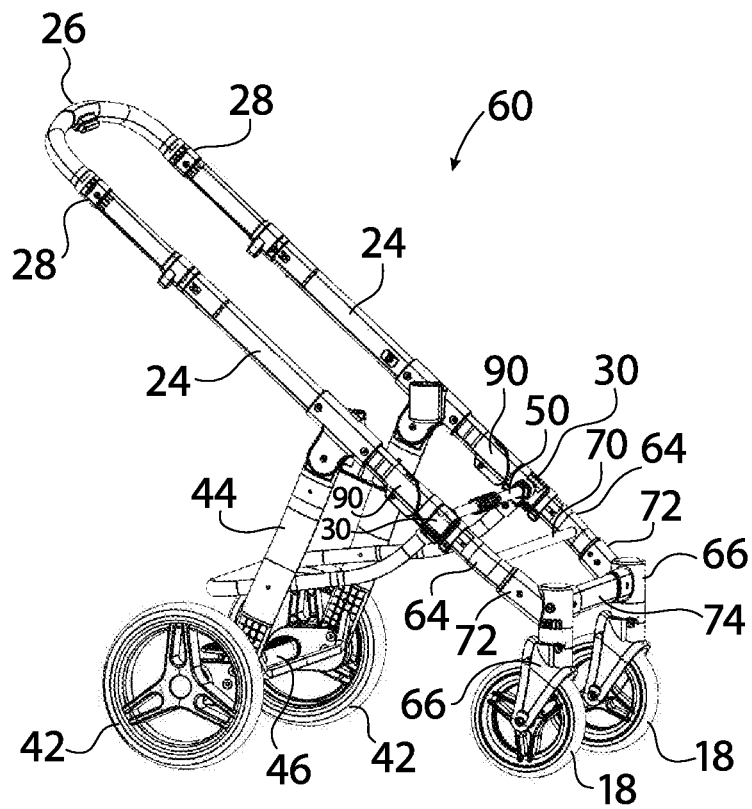
FIG. 2 illustrates a perspective view of the cross-over stroller with a city-mode front-end assembly.
Figure 3:
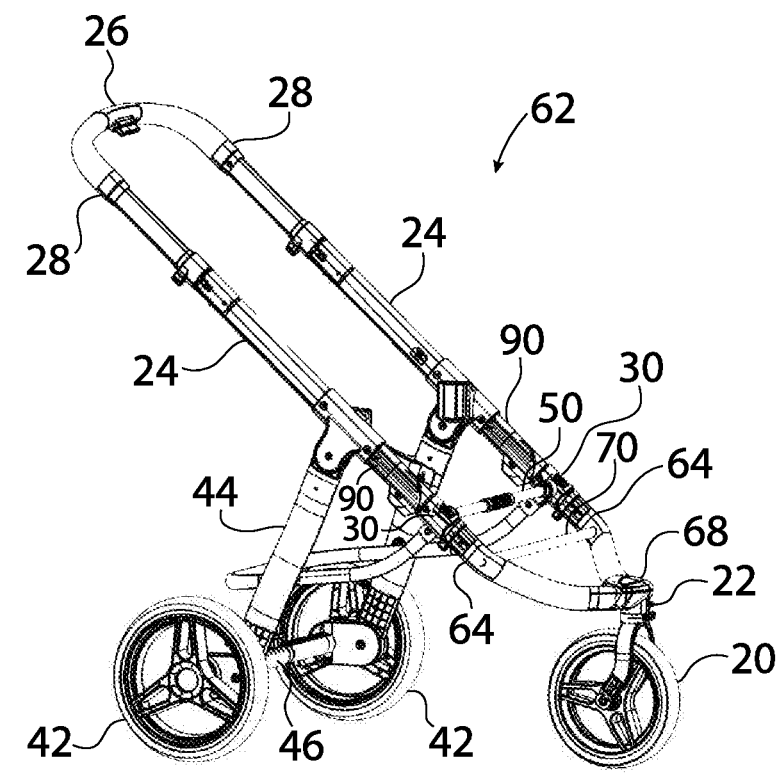
FIG. 3 illustrates a perspective view of the cross-over stroller with a sport-mode front-end assembly.
Figure 4:
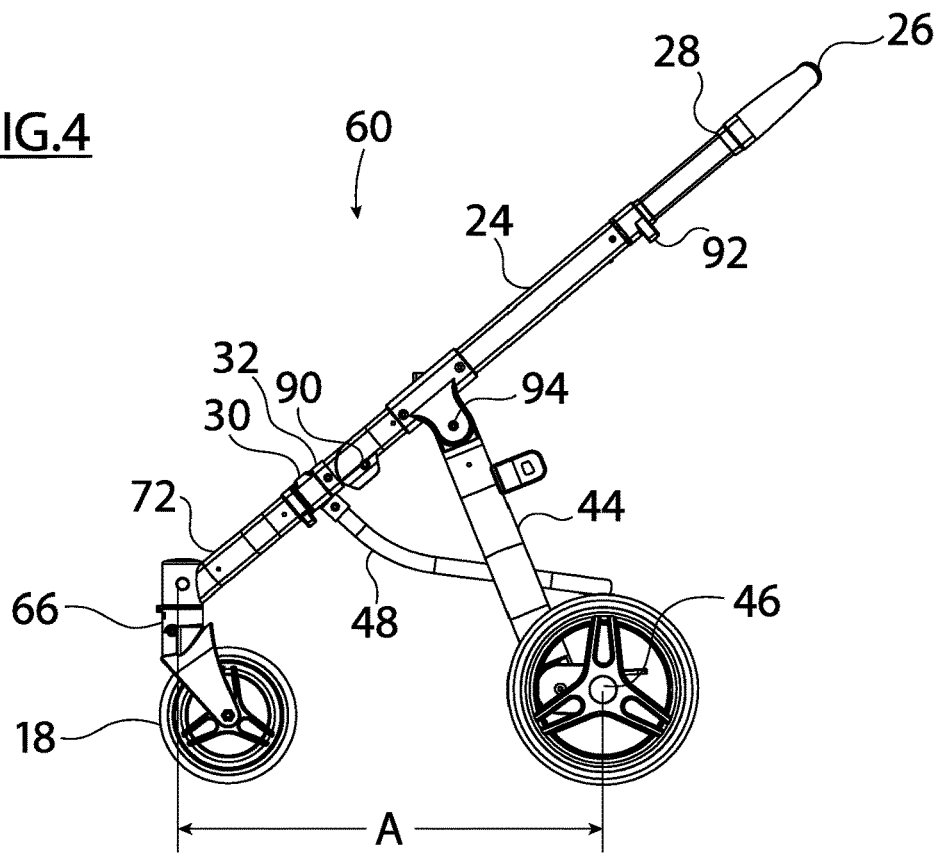
FIG. 4 illustrates a side view of the cross-over stroller of FIG. 2 with the city-mode front-end assembly.
Figure 5:
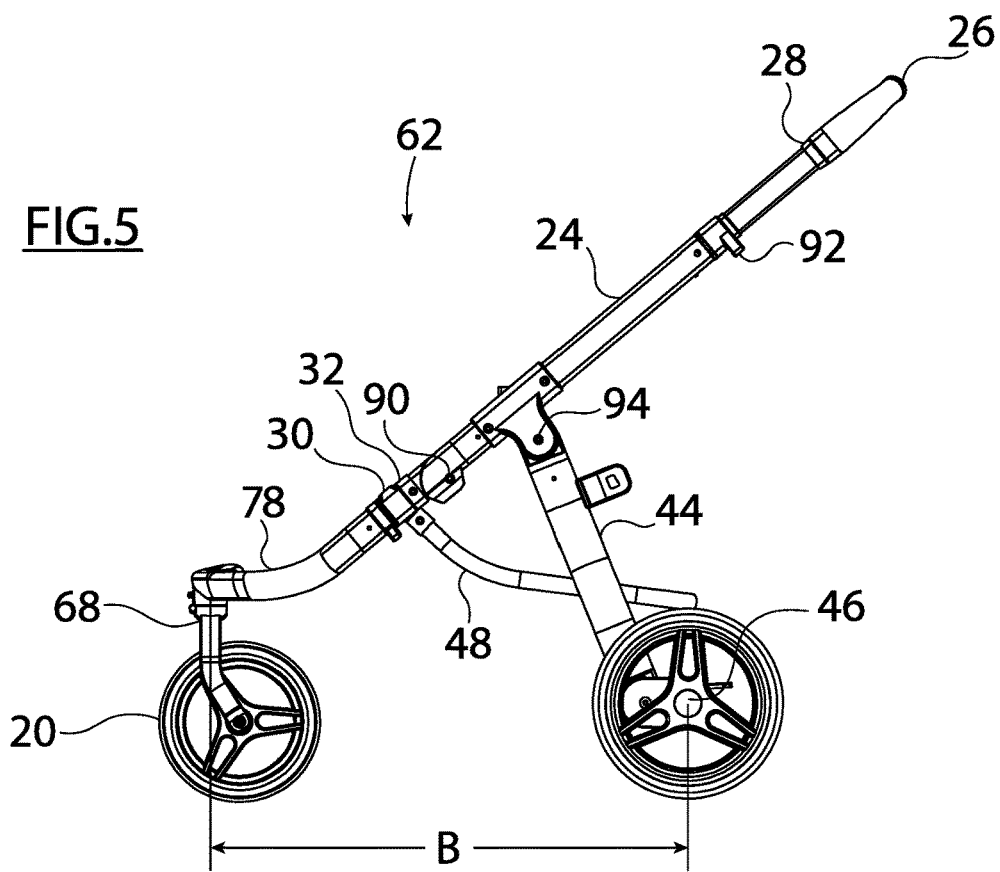
FIG. 5 illustrates a side view of the cross-over stroller of FIG. 3 with the sport-mode front-end assembly.

FIGS. 2-5 illustrate the cross-over stroller kit 10 of FIG. 1 assembled in the two configurations. FIGS. 2 and 4 illustrate the cross-over stroller as a city-mode stroller 60 with the four-wheeled front-end frame assembly 14 secured to the main frame 12. FIGS. 3 and 5 illustrate the cross-over stroller as a sport-mode stroller 62 with the three-wheeled front-end frame assembly 16 secured to the main frame 12.

To maintain the aesthetic look of a one-piece frame in each the stroller configurations 60, 62, the front-end frame assemblies 14, 16 have lower-frame supports 64 that are contiguous to the upper-frame supports 24. The lower-frame supports 64 have a circumference, shape and/or cross-section that is generally equal to the circumference, shape and/or cross-section of each of the upper-frame supports 24. The front-end frame assemblies 14, 16 also provide structural rigidity and integrity to the stroller configurations 60, 62 with a front-end crossbar 70 that connects between the lower-frame supports 64. As shown in FIGS. 2 and 3, the front-end crossbar 70 is generally parallel to the main crossbar 50 when the front-end frame assemblies 14, 16 are secured to the main frame 12 to form each of the city-mode 60 and sport-mode 62 stroller configurations 60, 62.

The city-mode stroller configuration 60 is a four-wheel stroller having two smaller, more maneuverable front wheels 18 that are spaced apart. The city-mode front-end frame assembly 14 has a pair of front-wheel supports 72 that each connect to a separate wheel fork 66. The wheel forks 66 allow the two front wheels 18 to pivot independently. The wheel forks 66 also each have a suspension 76 to absorb bumps and variations in the strolling surface and provide a smoother ride. The wheel forks 66 and front-wheel supports 72 are connected by a lower crossbar 74. The lower crossbar 74 is shorter than the front-end crossbar 70 and the main crossbar 50. The crossbar 74 is sized to keep the wheels 18 spaced apart a minimum distance for maneuverability and compact folding, yet prevent the wheels 18 from touching even when pivoted toward each other, as shown in the folded position in FIG. 6B.

The sport-mode stroller configuration 62 is a three-wheel stroller that has a single larger wheel 20. The sport-mode front-end frame assembly 16 has a pair of front-wheel supports 78 that angle toward each other and connect to a single wheel fork 68 for the single front wheel 20. The wheel fork 68 has a swivel feature 22 that allows the front wheel 18 to swivel and rotate 360-degrees or be locked to prevent rotation. The single wheel fork 68 also has a tracking feature for keeping the stroller's movement straight.

The rear wheels 42 are generally air filled and may be larger than the any of the front wheels 18, 20. For example, the rear wheel 42 may be twelve inches in diameter while the two front wheels 18 are eight inches in diameter and the single front wheel 20 is ten inches in diameter. Other sized wheels may also be used. The front wheels 18, 20 may also be air-filled or use other suitable wheels.

The stroller kit 10 provides a stroller having both a four-wheel travel system stroller and a three-wheel all-terrain jogging stroller. As best shown in FIGS. 4 and 5, the city-mode stroller 60 with four-wheels has a shorter wheelbase A than the wheelbase B of the sport-mode stroller 62. The wheelbases A, B are measured from the 66, 68 front fork to the rear axle 46. For example, the wheelbase A may be approximately 614 cm while wheelbase B may be approximately 701 cm. In another embodiment, wheelbase B of the sport-mode stroller 62 may be at least ten percent longer than the wheelbase A of the city mode stroller 60. In another embodiment, wheelbase B of the sport-mode stroller 62 may be ten to twenty-five or more percent longer than the wheelbase A of the city mode stroller 60.

Figure 6A:
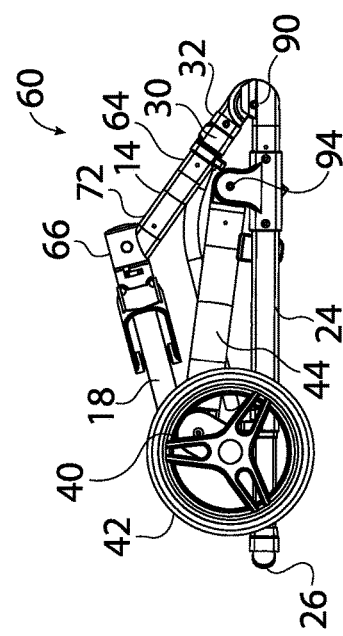
FIG. 6A illustrates a side view of the cross-over stroller of FIG. 2 with the city-mode front-end assembly in a folded position.
Figure 6B:
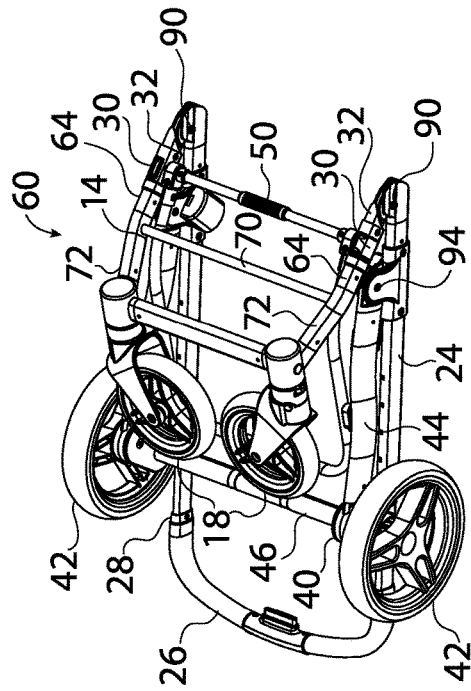
FIG. 6B illustrates a bottom perspective view of the cross-over stroller of FIG. 2 with the city-mode front-end assembly in a folded position.
Figure 7A:
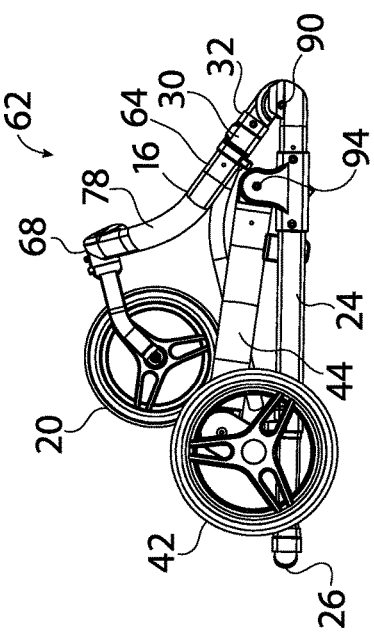
FIG. 7A illustrates a side view of the cross-over stroller of FIG. 3 with the sport-mode front-end assembly in a folded position.
Figure 7B:
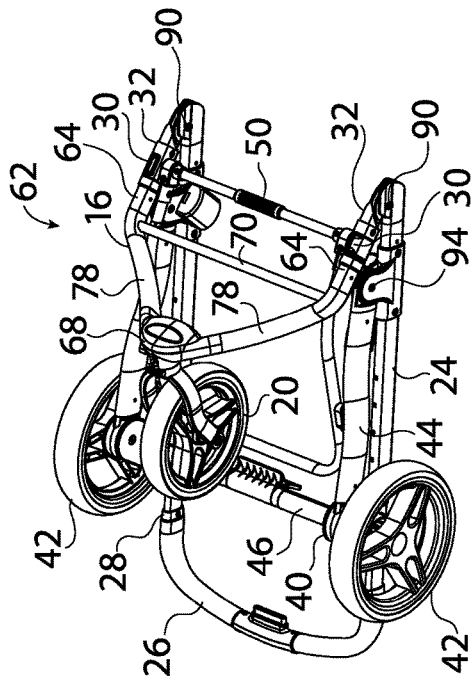
FIG. 7B illustrates a bottom perspective view of the cross-over stroller of FIG. 3 with the sport-mode front-end assembly in a folded position.

As shown in FIGS. 6 and 7 the stroller can be folded compactly whether it is in the city-mode configuration 60 (FIG. 6A-6B) or the sport-mode configuration 62 (FIG. 7A-7B). The main frame assembly 12 has a folding joint 90 that can pivot the upper-frame supports 24 to a folded position when the folding triggers 92 are actuated. The folding joint 90 is formed along the upper-frame supports 24 and is positioned above the front-end attachment system 30. In the use position, as shown in FIGS. 1-5, the folding joint 90 is locked and the upper-frame support 24 forms a generally linear beam. When the folding triggers 92 are pulled, the folding joint 90 is released so the upper-frame supports 24 fold and the lower distal end 32 rotates toward the upper distal end 28. When the triggers 92 are pulled, a rod disengages a notch 96 (FIGS. 9-10) that allows the upper support frames 24 to fold.

As the strollers are folded, the front-end frame assemblies 14, 16 rotate and move toward the rear wheelbase 40. As shown in FIGS. 6 and 7, when the stroller is folded, the front wheels 18, 20 are moved closer to the rear wheels 42 and are not separated by the wheelbase distance A, B. In the fully folded position, the front wheels 18, 20 are positioned adjacent to the rear wheels 42.

When the main frame assembly 12 is moved to the folded position, the rear support struts 44 rotate at pivot joint 94. The rear support struts 44 rotate toward the handle 26 and distal end 28 of the upper-frame supports 24 when the stroller is moved to a folded position, as shown in FIGS. 6 and 7.

The side support bars 48 and rear basket bar 54 provide rigidity during folding. As shown in FIGS. 6 and 7, the side support bars 48 are fixed and do not pivot relative to the rear support struts 44. As the rear support struts 44 rotate during folding, the side support bars 48 pivot relative to the upper-frame supports 24 and the rear basket bar 54 moves inside the rear axle 46 to a compact position.

Figure 8:
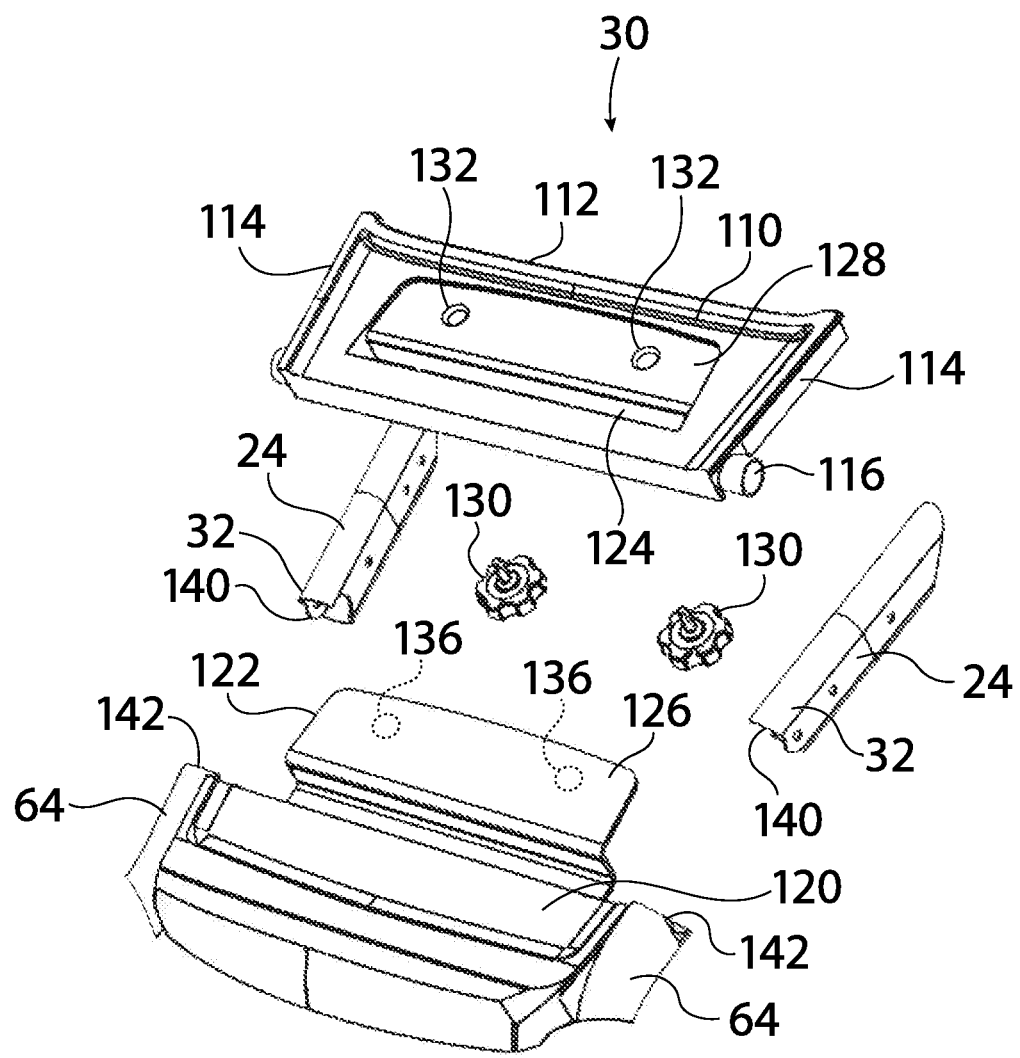
FIG. 8 illustrates an attachment interface between the upper main frame and the front-end assembly according to a first embodiment.

The main frame assembly 12 mates with the front-end frame assemblies 14, 16 with an attachment system 30 that provides structural integrity to the assembled city-mode stroller 60 and the sport-mode stroller 62. The attachment system 30 positively secures the front-end frame assemblies 14, 16 to the main frame assembly 12 and prevents inadvertent disconnection during use. However, the attachment system also allows the front-end frame assemblies 14, 16 to be easily swapped when desired. FIGS. 8 through 10 illustrate various attachment systems 30.

FIG. 8 illustrates the attachment system 30 according to one embodiment. As illustrated in FIG. 8, the attachment system 30 has a top kickplate 110. The top kickplate 110 may be mounted to the main crossbar 50 on an upper edge 112. Side regions 114 are supported on the upper-frame supports 24 of the main frame assembly 12. The top kickplate 110 may have a hidden cross bar 116 that can be attached by welding, for example, to add strength and stability with the achieved goal of having a ridged strolling feel.

A lower kickplate 120 is attached to the lower-frame supports 64. A metal clamp bracket 122 is attached to the lower kickplate 120. The bracket 122 may be made from steel or other suitably stiff material. The bracket 122 slides under and up through a slot 124 in the top holding kickplate 110 so that a flange 126 of the bracket 122 is positioned along a top surface 128 of the top kickplate 128. At least one removable mechanical fastener 130 extends through an aperture 132 in the top kickplate 110 and engages a boss 136 on the underside of the bracket 122 to securely attach the bracket 122 to the top holding kickplate 110 and thereby secure the front-end frame assembly 14, 16 to the main frame assembly 12.

The upper-frame supports 24 may have an attachment feature, such as an opening 140, at the distal end 32. The opening 140 receives a mating attachment feature, such as protrusion 142, on the lower-frame supports 64 to join the frame supports 24, 64 so the city-mode stroller 60 and sport-mode stroller 62 appear to have a continuous frame and are aesthetically pleasing in either stroller configuration.

Figure 9A:
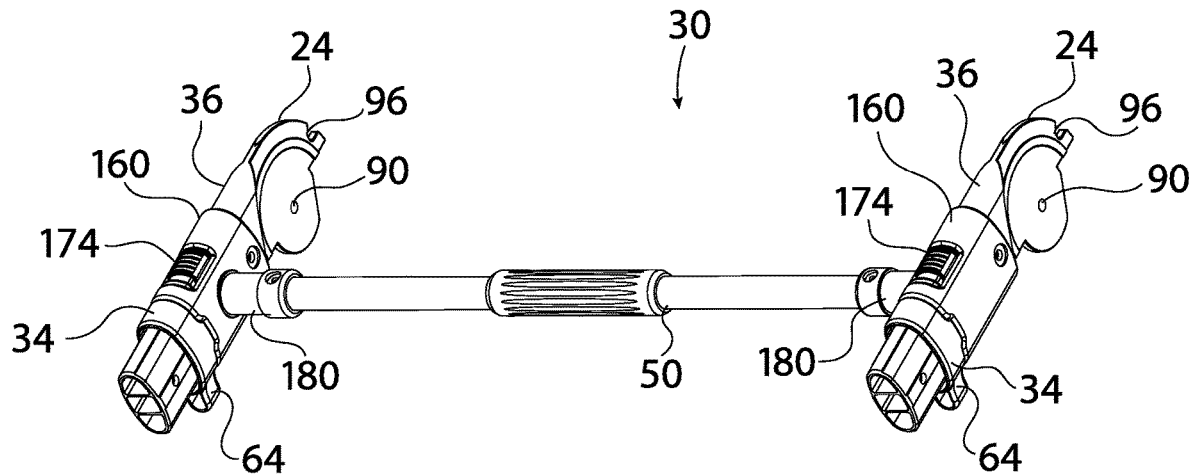
FIG. 9A illustrates an attachment interface between the upper main frame and the front-end assembly according to a second embodiment.
Figure 9B:
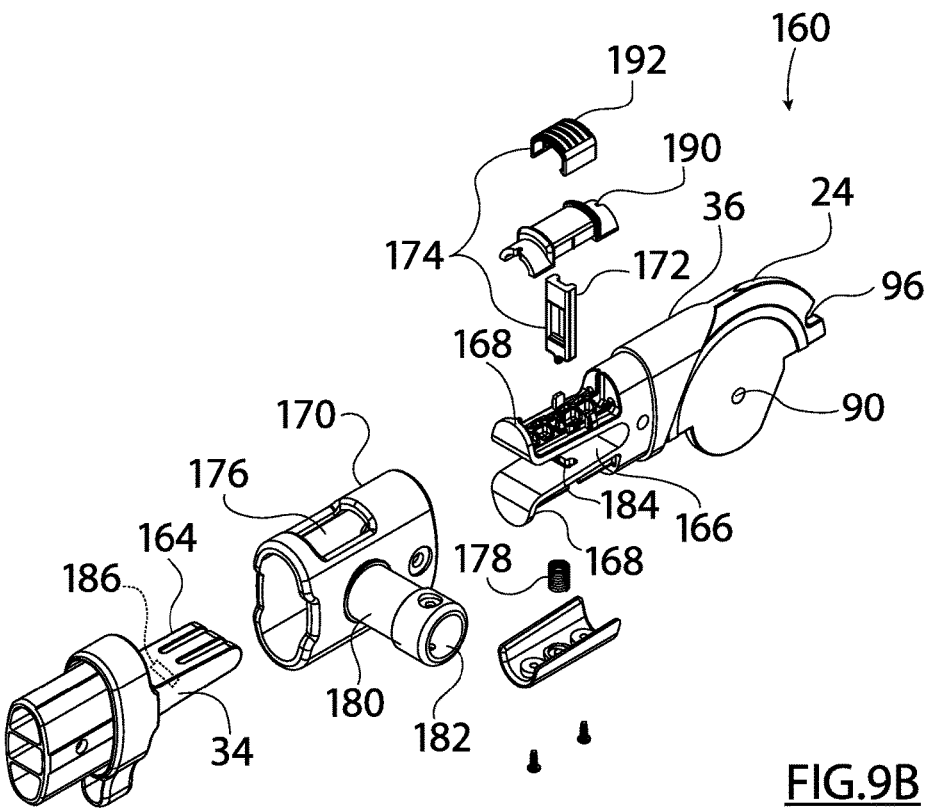

FIGS. 9A-9B illustrates the attachment system 30 according to another embodiment. The attachment system 30 includes swap mechanisms 160 located on both the left and right sides. The main crossbar 50 connects the left and right swap mechanisms 160.

The lower-frame supports 64 have an attachment feature 34 formed with a female extrusion 164. The upper-frame supports 24 include an attachment feature 36 having a slot 166 defined between two deflectable prongs 168 to catch the extrusion 164 in the slot 166. The attachment features 34, 36 may be formed integrally or molded as one piece with the frame bars 64, 24, or the attachment features 34, 36 may be mounted at the distal ends of the frame bars 64, 24.

The attachment system 30 also includes a swap housing 170. The prongs 168 are inserted into the housing 170 insert. The housing 170 includes a spring-loaded button assembly 174 that extends through a window 176 and cooperates with the prongs 168. The female extrusion 164 is then inserted into the housing 170 and the extrusion 164 is caught in the slot 166 between the prongs 168.

A post 172 in the button assembly 174 extend through an opening 184 in the prongs 168 and engage a notch 186 female extrusion 164. The spring 178 biases the post 172 into engagement with the notch 186 to maintain the lower attachment feature 34 locked to the upper attachment feature 36 and keep the front-end frame assemblies 14, 16 securely attached to the main frame assembly 12. When the button 190 is actuated, the post 172 disengages the notch 186 allowing the lower attachment feature 34 to be removed from the upper attachment feature 36 and allow the front-end frame assemblies 14, 16 to be swapped. The sliding cover 192 protects the button 190 from being inadvertently actuated.

The housing 170 includes a cross-bar receiver 180 having an opening 182 for receiving and retaining the main crossbar 50. The lower and upper attachment features 34, 36 may be made from either steel or other suitably stiff material (such as PA6 30% GF) or a combination of both.

Figure 10A:
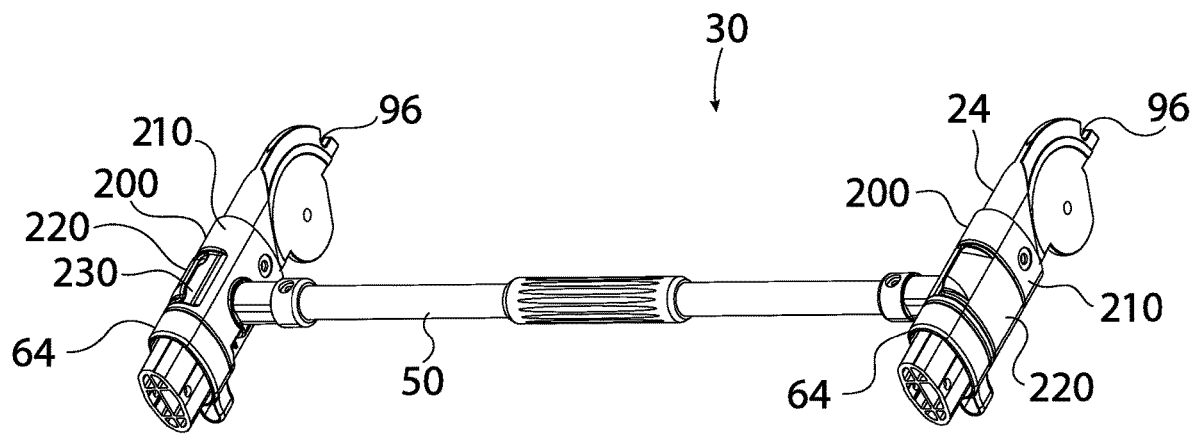
FIG. 10A illustrates an attachment interface between the upper main frame and the front-end assembly according to a third embodiment.
Figure 10B:
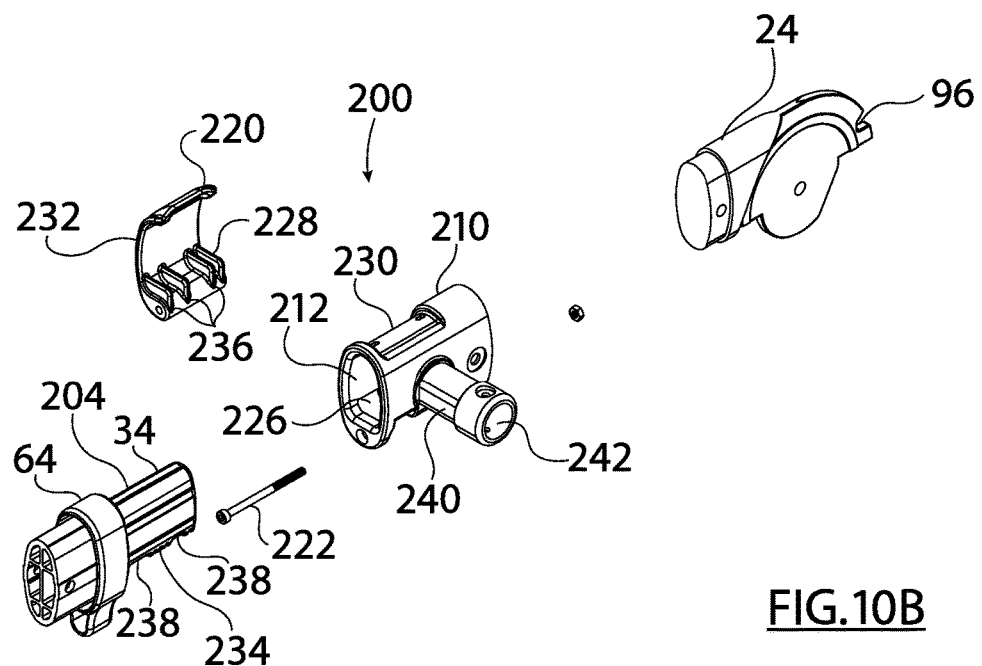
FIG. 10B illustrates an exploded view of a portion of the attachment interface in FIG. 10A.

FIGS. 10A and 10B illustrate the attachment system 30 according to another embodiment. The attachment system 30 includes swap mechanisms 200 located on both the left and right sides. The main crossbar 50 connects the left and right swap mechanisms 160.

The lower-frame supports 64 have an attachment feature 34 formed with a female extrusion 204. The upper-frame supports 24 include an attachment feature 36 having a housing 210 with a receiving opening 212 shaped to correspond to the female extrusion 204. As shown in the exploded view in FIG. 10B, the receiving opening 212 and the female extrusion 204 are asymmetric to provide a keyed engagement and ensure the proper alignment and locking.

A cam lever 220 is mounted to pivot about pin 222 relative to the housing 210 between an unlocked and locked position. The housing 210 includes locking window 226 that is shaped to correspond with a locking cam 228 on the cam lever 220 and a locking detent 234 on the female extrusion 204. The housing 210 further includes a recessed surface 230 shaped to correspond with the lever body 232 when the cam lever 220 is closed and in the locked position flush with the housing 210. The female extrusion 204 also has grooves 238 that correspond to ribs 236 on the locking cam 228 of the cam lever 220.

When the cam lever 220 is pivoted away from the housing 210 to an unlocked position, the female extrusion 204 can be inserted and/or removed to swap the front-end frame assemblies 14, 16 on the main frame assembly 12.

To attach the front-end frame assemblies 14, 16, the cam lever 220 is unlocked and then the female extrusion 204 is inserted into the receiving opening 212 until the locking detent 234 is positioned in the locking window 226. As the cam lever 220 is pivoted to a closed position, the ribs 236 engage the grooves 238 on the locking detent 234 to clamp and lock the female extrusion 204 in the housing 210. In the locked and closed position, as shown in FIG. 10A, the lever body 232 is positioned in the recessed surface 230 of the housing 210.

The housing 210 includes a cross-bar receiver 240 having an opening 242 for receiving and retaining the main crossbar 50. The lower and upper attachment features 34, 36 may be made from either steel or other suitably stiff material (such as PA6 30% GF) or a combination of both.

Figure 11A:
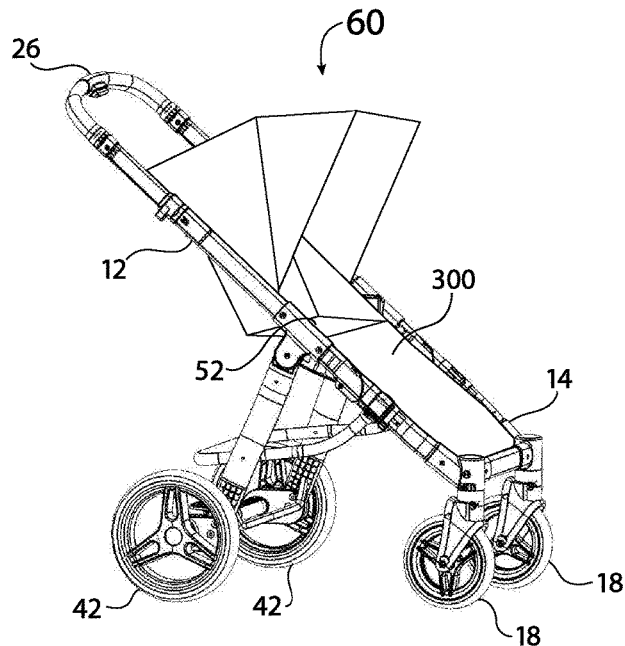
FIG. 11A illustrates a perspective view of the cross-over stroller having a fabric child seat with the city-mode front-end assembly.
Figure 11B:
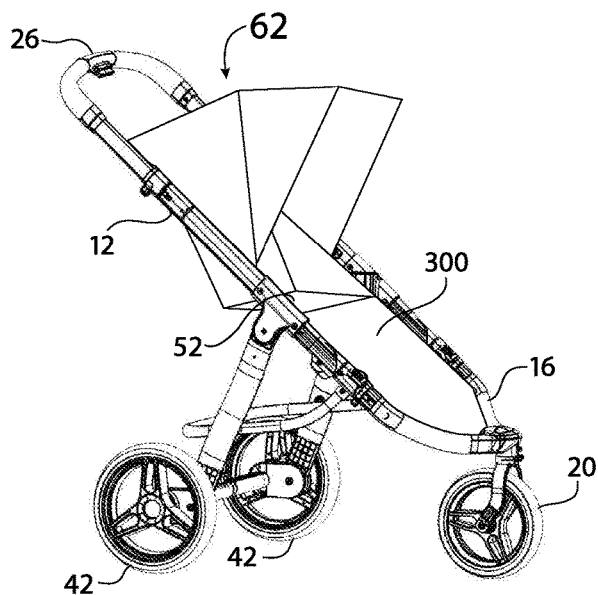
FIG. 11B illustrates a perspective view of the cross-over stroller having a fabric child seat with the sport-mode front-end assembly.

FIGS. 11 through 12 show the flexibility in seating options using the stroller kit. For example, FIG. 11A shows a four-wheel, city-mode stroller 60 having a fabric child seat 300. The fabric child seat 300 is secured with a mounting feature that mates with the mounting clips 52. The fabric child seat 300 may be secured to the frame with mounting features such as snaps, buttons, b-rings, velcro or any other suitable mounting features. The fabric child seat 300 is flexible and may be folded when the frame is folded, as discussed and illustrated in FIGS. 6-7. FIG. 11B shows a three-wheel, sport-mode stroller 60 having the fabric child seat 300 that can be easily achieved by swapping the front-end frame assemblies 14, 16.

Figure 12A:
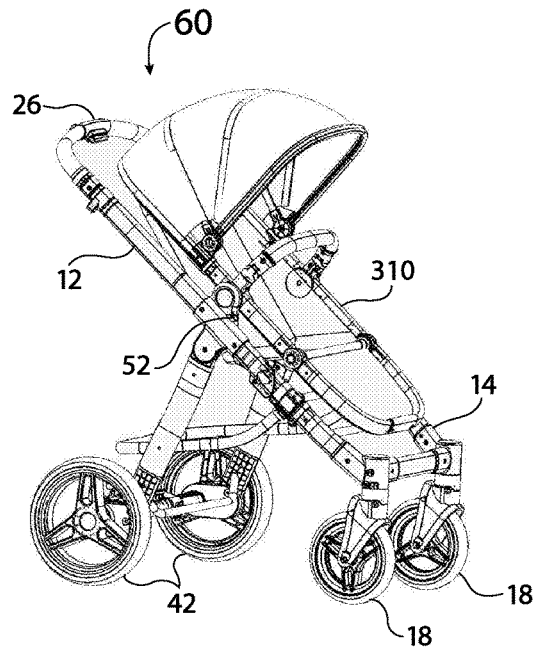
FIG. 12A illustrates a perspective view of the cross-over stroller having a reversible pod seat with the city-mode front-end assembly.
Figure 12B:
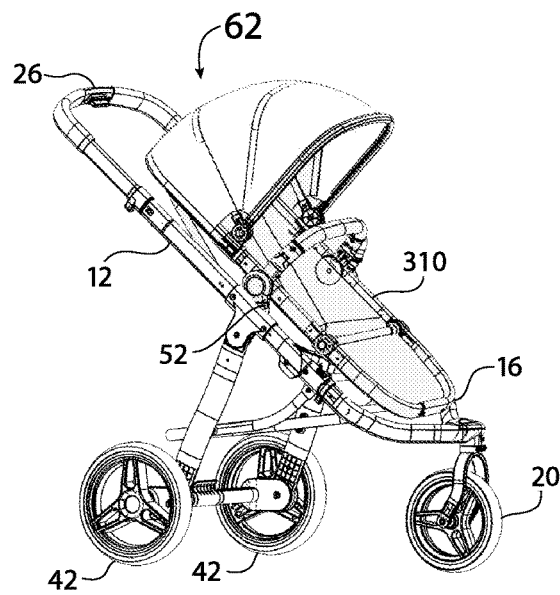
FIG. 12B illustrates a perspective view of the cross-over stroller having a reversible pod seat with the sport-mode front-end assembly.

FIG. 12A shows a four-wheel city-mode stroller 60 having a reversible pod seat 310. The reversible pod seat 310 may have a rigid frame or base that can be attached with a mounting feature that mates with the mounting clips 52. The pod seat 310 can be mounted to face forward or backward toward the handle 26. FIG. 12B illustrates a perspective view showing a three-wheel, sport-mode stroller 60 having the pod seat 310 by interchanging the front-end frame assemblies 14, 16.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A cross-over stroller kit comprising:
a main frame assembly adapted to receive at least one child seat assembly and having a pair of upper-frame supports, wherein a stroller handle is provided at a rearward distal end of the upper-frame supports and an upper attachment feature is provided at a forward distal end of each of the pair of upper-frame supports, the main frame assembly having a rear wheelbase extending from the upper-frame supports;
a first front-end frame assembly having two front wheels connected to a pair of lower-frame supports having a lower attachment feature adapted to mate with the upper attachment feature to secure the first front-end frame assembly to the main frame assembly, wherein the first front-end frame assembly is adapted to be secured to the main frame assembly to define a first stroller having four wheels; and
a second front-end frame assembly have a single front wheel connected to a second pair of lower-frame supports having a second lower attachment feature adapted to mate with the upper attachment feature to secure the first front-end assembly to the main frame assembly, wherein the second front-end frame assembly is adapted to be secured to the main frame assembly to define a second stroller having three wheels;
wherein each of the pair of upper-frame supports have a folding joint disposed between the rearward distal end and the lower distal end, wherein when the folding joint is actuated, the upper and lower distal ends rotate toward the rear wheelbase, wherein the folding joint is adapted to folded when at least one of the first and second front-end frame assemblies is secured to the main frame assembly.

2. The stroller kit of claim 1, wherein the upper attachment feature comprises a receptacle and the first and second lower attachment features comprise an extrusion sized to be received by the receptacle.

3. The stroller kit of claim 1, further comprising a crossbar extending between the upper attachment features thereby connecting the pair of upper-frame supports to provide structural integrity to the main frame assembly when the first and second front-end frame assemblies are removed.

4. The stroller kit of claim 1, wherein the first stroller has a first wheelbase length being shorter than a second wheelbase length of the second stroller.

5. The stroller kit of claim 1, wherein the circumference of each of the upper-frame supports is generally equal to the circumference of each of the first and second lower-frame supports so that the upper-frame support and first and second lower-frame supports are generally contiguous when connected to define the first and second strollers, respectively.

6. The stroller kit of claim 1, wherein the diameter of each of the pair of front wheels of the first front-end frame assembly is less than the diameter of the single wheel of the second front-end assembly.

7. The stroller kit of claim 1, wherein the single front wheel of the second front-end frame assembly is adapted to swivel, the second front-end assembly further comprising a lock feature to fix the single wheel and prevent the single wheel from swiveling.

8. The stroller kit of claim 1, further comprising a first child seat assembly, wherein the main frame assembly has a pair of mounting clips to removably mount the first child seat assembly on the main frame assembly, each mounting clip disposed along each of the pair of upper-frame supports.

9. The stroller kit of claim 8, further comprising a second child seat assembly different from the first child seat assembly that mounts to the main frame assembly with the pair of mounting clips.

10. The stroller kit of claim 9, wherein the first child seat assembly has a rigid frame, and wherein the second child seat has flexible fabric that is adapted to fold when the upper-frame supports rotate to a folded position.

11. A cross-over stroller kit comprising:
a main frame assembly adapted to receive at child seat assembly and having a rear wheelbase and an upper attachment feature adapted to receive a lower attachment feature provided on first and second front-end frame assemblies;
the first front-end frame assembly having two front wheels and the lower attachment feature adapted to mate with the upper attachment feature to define a city-mode stroller having four wheels; and
the second front-end frame assembly have a single front wheel and a second lower attachment feature adapted to mate with the upper attachment feature to define a sport-mode stroller having three wheels;
wherein at least one of the upper and lower attachment features includes a cam-lever rotatable between and locked and unlocked positions, wherein the first and second front-end frame assemblies are detached from the main frame assembly by rotating of the cam-lever to the unlocked position.

12. The stroller kit of claim 11, wherein the city-mode stroller has a first wheelbase length being shorter than a second wheelbase length of the sport-mode stroller.

13. A cross-over stroller kit comprising:
a main frame assembly adapted to receive at child seat assembly and having a rear wheelbase and an upper attachment feature adapted to receive a lower attachment feature provided on first and second front-end frame assemblies;
the first front-end frame assembly having two front wheels and the lower attachment feature adapted to mate with the upper attachment feature to define a city-mode stroller having four wheels; and
the second front-end frame assembly have a single front wheel and a second lower attachment feature adapted to mate with the upper attachment feature to define a sport-mode stroller having three wheels;
wherein at least one of the upper and lower attachment features includes a spring-loaded actuator, wherein the first and second front-end frame assemblies are detached from the main frame assembly by actuation of the spring-loaded actuator.

14. A cross-over stroller kit comprising:
a main frame assembly adapted to receive at least one child seat assembly and having a pair of upper-frame supports and a rear wheelbase with a pair of wheels;
a first front-end frame assembly having a first pair of lower-frame supports connected to a pair of front wheels;
a second front-end frame assembly having a second pair of lower-frame supports connected to a single front wheel; and
an attachment system to secure the main frame assembly to the first and second front-end frame assemblies to define a first stroller configuration having four wheels and a second stroller configuration having three wheels, respectively,
wherein the attachment system secures and aligns the pair of upper-frame supports to each of the first pair of lower-frame supports and the second pair of frame bars; and
wherein each of the pair of upper-frame supports have a folding joint is adapted to the upper-frame supports when at least one of the first and second front-end frame assemblies is secured to the main frame assembly, the at least one of the first and second front-end frame assemblies rotating toward the rear wheelbase when the upper-frame supports are folded.

15. The stroller kit of claim 14, wherein the circumference of each of the upper-frame supports is generally equal to the circumference of each of the first and second lower-frame supports so that the upper-frame support and first and second lower-frame supports are generally contiguous when aligned to define the first and second stroller configurations, respectively.

16. The stroller kit of claim 14, wherein the first stroller has a first wheelbase length being shorter than a second wheelbase length of the second stroller.

17. The stroller kit of claim 11, wherein the city-mode stroller has a first wheelbase length being shorter than a second wheelbase length of the sport-mode stroller.

* * * * *